United States Patent [19]

Sanda, Jr.

[11] 3,897,386

[45] July 29, 1975

[54] TIRE TREADS

[75] Inventor: Joseph C. Sanda, Jr., Akron, Ohio

[73] Assignee: The Firestone Tire & Rubber Company, Akron, Ohio

[22] Filed: June 8, 1972

[21] Appl. No.: 260,870

[52] U.S. Cl............ 260/42.47; 152/330; 260/37 N; 260/42.29
[51] Int. Cl........................... B60c 1/00; C08f 45/08
[58] Field of Search ..... 260/41.5 R, 37 N, 77.5 CR, 260/77.5 CH; 152/330

[56] References Cited
UNITED STATES PATENTS

| | | | |
|---|---|---|---|
| 2,749,960 | 6/1956 | Schwartz | 152/330 |
| 2,877,212 | 3/1959 | Seligman | 260/77.5 CR |
| 3,175,997 | 3/1965 | Hsieh | 260/85.1 |
| 3,208,500 | 9/1965 | Knipp | 152/330 |
| 3,427,366 | 2/1969 | Verdol | 260/77.5 CR |
| 3,450,653 | 6/1969 | McClellan | 260/37 N |
| 3,518,139 | 6/1970 | Lovell | 260/37 N |
| 3,648,748 | 3/1972 | Lovell | 152/330 |
| 3,701,374 | 10/1972 | McGillvary | 152/330 |
| 3,714,110 | 1/1973 | Verdol | 260/77.5 CR |

FOREIGN PATENTS OR APPLICATIONS

| | | |
|---|---|---|
| 806,450 | 12/1958 | United Kingdom |

OTHER PUBLICATIONS

Sinclair Petrochemicals Company's Product, Data Bulletins, No. 505.

Primary Examiner—Joseph L. Schofer
Assistant Examiner—P. R. Michl

[57] ABSTRACT

In the production of vehicle tires, a vulcanizable tread composition which includes a reinforcing agent is applied to the tread portion of a tire mold and a tire body is then centrifugally cast in the mold against this tread. The tread is prepared from an elastomeric polymer selected from the class consisting of (a) polyhydroxy conjugated diene homopolymers or copolymers, (b) polyhydroxy copolymers of a conjugated diene and an aromatic vinyl monomer and (c) polyhydroxy copolymers of a conjugated diene and a vinyl nitrile monomer, by reacting the same with a diisocyanate in a one-step reaction. Any moisture present will convert isocyanate terminal groups to amino groups, and thus more or less amino-terminated polymers will be present. The NCO/OH ratio of the reactants must be at least about 1.15 or higher up to 2 or even 3 or higher.

3 Claims, 1 Drawing Figure

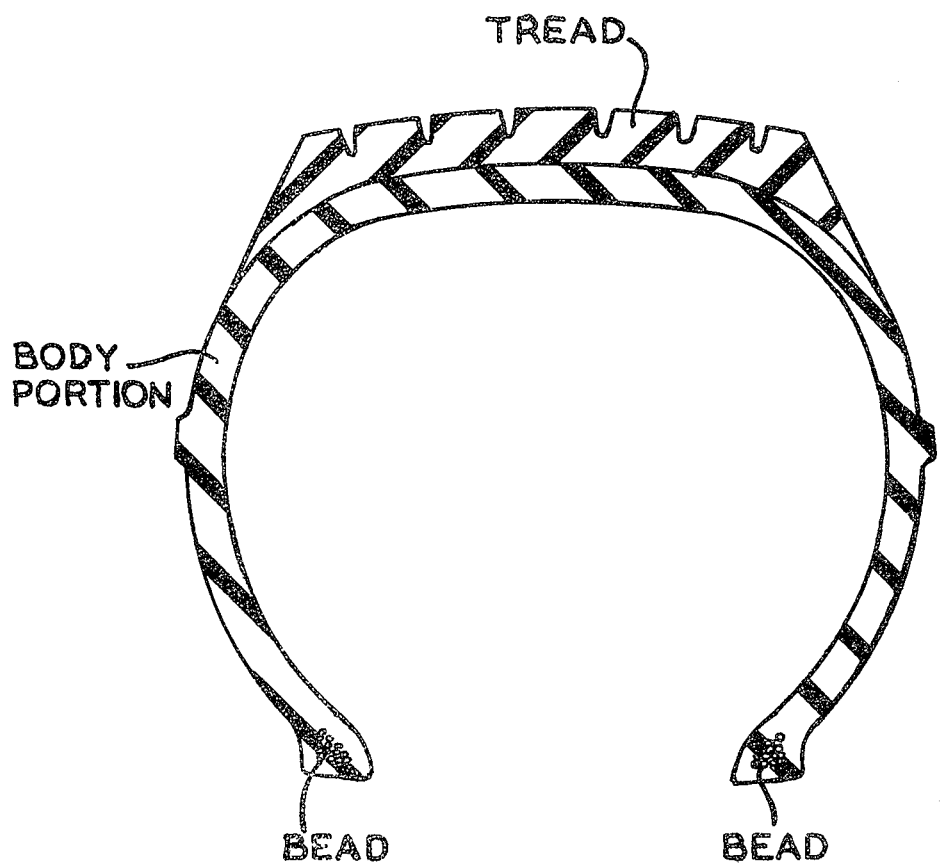

TIRE TREADS

BACKGROUND OF THE INVENTION

This invention relates to a novel process for producing vehicle tires. The tire body of a liquid rubber composition is preferably centrifugally cast and free of reinforcing elements. However, the tire body may contain reinforcing elements such as short fibers or carbon black, etc. Alternatively, a conventional tire body may be used with the tread of this invention and adhered thereto by an adhesive, if necessary. The tread is not cast, but is usually placed in a mold and the tire body is cast against it. The invention includes the new uncured tread composition, the new tread and the method of producing it.

The tread which includes a reinforcing agent such as carbon black or silica or a metal oxide, etc. is formed from a polyurethane, a reaction product of (1) an hydroxylated polymer which contains at least two hydroxy groups and (2) a polyisocyanate. The hydroxylated polymer is derived from the class consisting of (a) conjugated diene homopolymers or copolymers (e.g. polybutadiene, polyisoprene, polychloroprene, polypiperylene, butadiene-isoprene, etc.), the diene of which contains 4 to 6 carbon atoms, (b) copolymers of such a conjugated diene and an aromatic vinyl monomer (e.g. butadiene-styrene, isoprene-styrene, butadiene-vinyl naphthalene, butadiene-alpha-methyl styrene, etc.) and (c) copolymers of such a conjugated diene and a vinyl nitrile monomer (e.g. butadiene-acrylonitrile, isoprene-acrylonitrile, butadiene-alpha- or beta-methylacrylonitrile, etc.). The foregoing copolymers refer to rubbers produced from monomers of the usual monomer percentage ranges, and copolymers of other suitable monomer ranges. The polymer of the tread may comprise mixtures of the foregoing polymers and polyisocyanates or mixtures of any one or more of the foregoing and other rubber such as scrap vulcanized rubber mixture. Also, hydroxy-terminated polyethers, hydroxy-terminated polyesters, hydroxy-terminated polyisobutylene, etc. may be blended with the foregoing polymers.

Any of the usual diisocyanates may be used in producing the polyurethane, although it is conceivable that a reactant or a mixture of reactants containing more than two isocyanate groups may be employed. It will be understood that references to diisocyanates herein include such compounds and mixtures. Thus, a hydroxy-substituted rubber of any known type may be used, as well as other isocyanate-extendable hydroxy polymers, and elastomeric products containing no unsaturation may be used alone or mixed with rubbers. Usually the elastomers will contain two to three reactive groups but may contain more, up to four or five or more hydroxyl groups on the average. Solid rubber, scrap rubber, reclaimed rubber, etc. may be blended into the tread composition. The tread of this invention will include any substantial amount of a vulcanizate derived from a polymer with a backbone containing two or more hydroxyl groups extended with a polyisocyanate, and the elastomer of the tread may contain any amount thereof up to 100 percent.

The reactions of diisocyanates with hydroxylated compounds is not new. The reaction of diisocyanates with hydroxylated rubber polymers such as polybutadiene and butadiene-styrene is discussed at length in a series of bulletins starting with bulletins of Sinclair Petrochemicals Company's PRODUCT DATA BULLETINS Nos. 505, 506 and 508 and continued into PRODUCT BULLETINS of ARCO Chemical Company identified as BD-1 and 2. On page 20 of Sinclair's PRODUCT DATA BULLETIN No. 505 and page 18 of the revision thereof dated June 1967, reference is made to the use of the urea urethane resins in automotive and tractor tires, but these are two-step urethane reaction products. No reference in this series of bulletins is made to the use of a one-step urethane reaction product in tires. The manufacture of tires from certain of these ARCO products is discussed in RAPRA (Rubber and Plastics Research Association) Bulletin Vol. 25, No. 6 November-December 1971, pages 126–128, but referring to these ARCO and other products it states: "The final properties attainable at present are certainly not good enough for the highest quality products but development work is continuing." The invention of this patent application relates not to tires generally, but to tire tread compositions. In the above series of bulletins there is considerable discussion of the NCO/OH ratio in one-step urethane reactions and, more particularly, such reactions in which the NCO/OH ratio is 1.0 or 1.1 with compositions containing carbon black or silica or zinc oxide (or other metal oxide), but the bulletins make no reference to compositions suitable for use as tire treads. As used in the art, NCO/OH ratio is defined as the number of equivalents of isocyanate groups per one equivalent of a hydroxy group. Higher ratios are mentioned in that series of bulletins when such fillers are not present, but in a tire tread it is necessary to employ some such reinforcing agent as mentioned, and it is a feature of this invention that with such reinforcing agents a ratio of greater than 1.1 has been found most satisfactory. In fact, ratios of 1.15 or 3.0 or greater, such as 4.0 or 5.0 or even more, have been found satisfactory, depending upon the filler present.

When the ratio is 1.1 or less, if carbon black or silica is blended with the elastomer, an auxiliary peroxide is needed to produce a satisfactory vulcanizate. In such cases when peroxide is omitted, treads perform poorly, as they tend to have excessive heat build-up, causing blowing.

Surprisingly, in these systems where carbon black or silica is blended with the elastomers, it has been found that when auxiliary sulfur cures are used, NCO/OH ratios higher than 1.15 (preferably 1.35 or higher) are needed to produce good vulcanizates. Otherwise, vulcanizates are cheezy and undercured.

In the production of tires by centrifugal casting, a number of elastomeric materials have been used. These materials are selected for their properties of pourability, with a subsequent hardening into a rubbery state suitable for use in vehicle tires, either pneumatic or non-pneumatic. It has been found, however, that the desired properties for the tread of a tire, such as skid resistance, etc. are not compatible with those properties required in sidewall areas, such as strength and a high modulus, for example. Accordingly, composite tires have been suggested, in which dissimilar materials are employed for the tread portion and the tire body. One such construction employs a pre-formed tread section of a solid natural or synthetic rubber compound which is placed in a mold, sidewalls of a polyurethane compound being centrifugally molded thereon to form a composite tire. See British Pat. No. 1,118,428. The principal difficulty with this type of construction is that of obtaining good adhesion between the tread and the tire body, since these materials are quite dissimilar chemically.

There is much art on forming polyurethanes from dihydroxy polybutadiene and butadiene copolymers. Hsieh U.S. Pat. No. 3,175,997 refers to the use of polyurethanes as conventional tread stocks, etc. and includes reference to curing the diisocyanate reaction product of dihydroxy polybutadiene with sulfur, but does not tell how to make a good tread. Goldberg U.S. Pat. No. 3,055,952 refers to placing a milled-mixture of a diisocyanate and dihydroxy polybutadiene in a mold with only enough pressure to force it to assume the shape of the mold and curing with sulfur, but makes no reference to tire manufacture.

THE INVENTION

Tread stocks used in carrying out this invention are to be distinguished from other tire stocks because they must have good traction, both wet and dry, and skid resistance. It is important that if a tire skids, the tread is not heated to such an extent that the rubber is melted sufficiently to prevent the tire from having good skid resistance. Tread stocks must be abrasion resistant in order to have long life. Also, uncured tread stocks may be much stiffer than those used in the body of a tire.

The tread stock may be a blend of the different polymers described herein and may contain small amounts of other elastomers. It will comprise at least 25 or 50 percent or more of a polymer referred to herein. The polymers referred to herein are derived from elastomers which comprise at least two hydroxyl groups. These are preferably terminal groups. The polymers in many cases have more than two such reactive groups per chain; as many as five or more in some cases. However, the average functionality usually should be no more than 3.0. Functionality is determined here from hydroxy content data (e.g. data obtained by the Willett-Ogg hydroxyl determination, infrared analysis, etc.) and molecular weight data (e.g. VPO molecular weight, dilute solution viscosity molecular weight, gel permeation chromatrography, etc.), and considerable difficulties exist in obtaining accurate functionality in this manner.

The preparation of the polyurethane prepared from dihydroxy polybutadiene may be illustrated by the following equation:

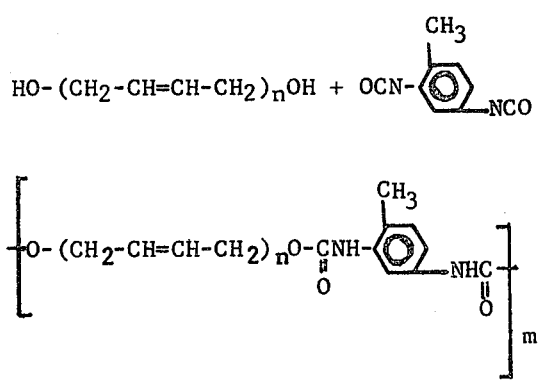

in which $n$ represents the number of butadiene groups in the polymer and m represents the number of polyurethane repeating units. In the reaction, $n$ will have a value of from 10 to 250 or 270 or even 300, giving molecular weights of substantially 600 to preferably about 3000, or 5000 or 15,000, for example; and $m$ is such that the molecular weight of the polymer is, for example, 20,000 or more after chain extension. Such reactions are well known in the art. Although the hydroxy groups are represented as being terminal, it is generally presumed that this is the case although they may not be terminal in all cases. There may be more than two hydroxy groups connected with the polybutadiene units. Regardless of the number of hydroxy groups, an equal number of isocyanate groups is required to complete the reaction, as illustrated in the equation, and this is true regardless of whether the elastomer is polybutadiene or any other elastomer. The ratio of —NCO/—OH as represented by the formula is at least 1.15 and this is true regardless of the number of hydroxy groups present and regardless of what diisocyanate is employed in carrying out the reaction. The diisocyanates are very active and react with any moisture present, and react with other impurities and also are reactive with materials compounded with the polyurethane such, for example, as functional groups present on carbon black or silica, etc. surfaces. Thus, when carbon black or other impure or reactive component is compounded with polyurethane as in the compositions of this invention, excess isocyanate over and above that required for a 1:1 NCO/OH ratio must be added in order to react with water, etc. Also, some excess isocyanate is desirable to effect cross-linking by means of allophanate formation. Reaction of water with isocyanates produces a primary amine which, in turn, enters into the chain extension reaction and cross-linking reactions by formation of ureas and biurets, etc.

Compositions of matter are disclosed in which the NCO/OH ratio is 1.15 or 1.3 or 1.5 or higher up to 3 or more in the one-step urethane synthesis in which a reinforcing agent is used, all as illustrated herein. It was surprising to find that good vulcanizates were obtained with stocks in which such high ratios were utilized. It was previously thought that such high ratios would produce inferior and undercured stocks because a substantial portion of the hydroxy groups would be converted to isocyanate groups and this in turn would prevent efficient chain extension. The advantage of using higher NCO/OH ratios is illustrated in the examples.

The amount of diisocyanate to be used depends upon the following: (1) the molecular weight of the polymer; (2) the functionality of the polymer; (3) the molecular weight of the chain-extending agent; (4) the functionality of the chain-extending agent; (5) the amount of impurities (such as water) and (6) the reactive sites on the surfaces of fillers used, such as carbon black, etc. For instance, the amount of moisture present with the commercial carbon black may vary, and the amount of carbon black used may vary from 35 or less to 200 or more parts per 100 parts of polymer. Thus, it is impossible to accurately suggest the amount of such chain-extending agents to be used.

It is evident from the art that a wide variety of diisocyanates may be used in carrying out the invention as, for example, toluene (a mixture of 2,4 and 2,6 isomers) diisocyanate, dianisidine diisocyanate, diphenyl methane diisocyanate, hexamethylene diisocyanate, bitoluene diisocyanate, polymethylene polyphenyl isocyanate, etc. The amount of diisocyanate required to produce a good cure depends somewhat upon the structure of the diisocyanate employed.

The diisocyanate reaction may be catalyzed by any of the conventional urethane catalysts such as dibutyl tin dilaurate, 1,4-diazabicyclo[2,2,2] octane (DABCO), stannous octoate, etc. Dibutyl tin dilaurate is especially useful, in that high and low temperatures may be used in curing. DABCO causes reversion at high (e.g. 300°F. and over) temperature cures.

This invention is directed towards a one-step polyurethane synthesis reaction as opposed to the two-step urethane reaction.

In the one-step reaction involving NCO and OH groups, sufficient isocyanate is added to effect a complete cure. This type of reaction is characterized by a short pot life (for example less than 3 hours) after the isocyanate has been mixed into the compound. By contrast, in the two-step urethane synthesis, approximately twice as much isocyanate is added to the compound. This effects the conversion of all hydroxy groups into isocyanate groups and in an inert atmosphere pot life is indefinite (e.g. 3 months or more). At this stage the compound is said to be in the pre-polymer form. Prepolymers are then cured generally by addition of dialcohols such as pentane diol, etc., or by diamines such as methylene-bis-ortho-chloroaniline. Actually, the tire bodies used in making tires from the treads of this invention may involve a two-step urethane reaction, and such bodies are combined with a one-step tread formulation.

The compounding ingredients in the tread stock can involve any type of carbon black such as GPF, ISAF, SAF, etc. or precipitated silica. Any type of processing oil can be used such as paraffinic, naphthenic and aromatic oils, dioctyl phthalate, etc. The higher aromatic oils appear to offer some advantages over the others.

The word "pigment" as used herein includes reinforcing pigments, antioxidants, antiozonants, fillers, etc.

Various types of antioxidants, antiozonants and the like may be employed as suggested by the prior-art use of such compounds in rubbers. However, the hindered phenols are probably the most useful since they probably are least reactive with isocyanates. From 5 to 10 or as many as 25 parts of Isonol C100 for instance, per 100 parts of a dihydroxy polymer may be used as a reinforcing agent.

The procedure for making tread stocks usually involves two steps. In the first step, the polymer and all compounding ingredients except the chain-extending agents are pre-mixed and ground down, preferably on a three-roll paint mill, Attritor mill, a Brabender mixer, etc. so that the reinforcing and other pigments are finely dispersed. This material is referred to as a masterbatch and has indefinite shelf life. The chain-extending agent is mixed into the masterbatch and the resulting tread compound is put into the tire mold just before the tire body is cast onto the tread. The mixing is conveniently effected on the same apparatus as used to make the masterbatch or in another mixing chamber such as a Baker-Perkins mixer. The time interval between mixing the chain-extending agent into the masterbatch and casting the tire body onto the tread stock should be as short as possible. Adhesion of tread to body is dependent upon little chain extension of the tread stock prior to adding the body to the mold. The chain-extension rate can also be controlled by varying catalyst level and oil level.

The foregoing is illustrative, and other procedures and apparatus may be employed as desired.

The drawing is a section of a tire prepared according to this invention. The tread may be of a desired thickness and the dividing line between the tread and the body of the tire may be varied in location and configuration.

The invention provides a tread composition on to which a tire body may be centrifugally molded. The thread and sidewall portions have dissimilar properties yet are firmly attached to produce an integral structure. An adhesive may be used in uniting them.

The tire is usually formed by first locating the tread stock in a tire mold and then centrifugally casting a liquid tire body-forming composition against the tread and curing both the tread and the tire body compositions together thereby forming a strong bond between them.

Reinforcing cords or plies may be placed in the mold over the tread before casting the tire body, but no reinforcement is necessary. Short reinforcing filaments may be compounded with the tread stock, if desired.

If polybutadiene units are present in the backbone of the polymer in the tread, whatever the elastomer from which the polymer is derived, it preferably comprises some 1,2-structure, and the 1,2-structure may be as high as 60 percent but 5 percent to 15 percent is preferable for wear and low temperature properties.

In producing the tread stock, hydroxy polymers may be freely mixed or interchanged, and the chain extension can be accomplished by mixing chain-extending agents together.

In commercial production there usually will be moisture and perhaps other impurities present in the polymer, carbon black, and other pigments which together form the masterbatch. Therefore, ratios of chain-extending agent to reactive terminals of at least 1.15 will be needed. Usually a ratio of 1.3 or 1.4 or higher will be required to insure the presence of sufficient diisocyanate for the polyurethane reaction. In commercial production it will not be efficient to dry the compounding ingredients or provide a uniform moisture content from batch to batch, so it is necessary to determine the moisture content of each batch, preferably after compounding with carbon black or other compounding ingredients, before carrying out the reaction with the diisocyanate, and to use sufficient diisocyanate to react with the moisture and dihydroxy polymeric material, and avoid any substantial excess, although a slight excess will usually be used. The tread of a tire is dependent upon the use of sufficient diisocyanate to react with the terminal hydroxy groups of the polymer and may depend upon whether sufficient is present to react with other hydroxyl groups that are present.

Although the moisture content of a masterbatch is difficult to determine, the problem is conveniently circumvented by curing small quantities of a masterbatch with different amounts of chain-extending agent (different NCO/OH ratios) and selecting from these the one ratio which gives the desired vulcanizate properties.

TIRE PRODUCTION

The art refers to apparatus which may be used in the casting of tires, such as disclosed in Beneze U.S. Pat.

No. 3,555,141, for instance. Such apparatus or improvements upon the same may be used in producing the tires from the tread compositions of this invention. The beads are supported in the mold cavity in any suitable manner. The tread is suitably located in the tread portion of the mold before casting the tire body against it. Compositions suitable for casting the body are known in the art. See, for example, British Pat. No. 1,139,643.

DESCRIPTION OF PREFERRED EMBODIMENT

The present invention relates to the production of treadstock compositions in a mold. The tire body may be centrifugally cast in the mold on to the tread stock. The tread-stock composition is usually so viscous that it will not flow easily during the casting of the body. It may be applied to the mold by troweling or the like, and a template similar to but longer than that described in Beneze U.S. Pat. No. 3,555,141 may be used.

In the molding of a tire, it may be found desirable to use a parting agent, such as a poly (methyl silicone) oil applied as an aerosol spray to the inner surfaces of the mold to aid in separation of the molded product from the mold.

The following examples are illustrative of the invention. The claims are not limited thereto.

In the examples which follow, trade names and designations are used to identify materials, the compositions of which are given below. The ARCO compositions (polybutadienes, butadiene-styrene and butadiene-acrylonitrile copolymers) all have polybutadiene backbones with this approximate microstructure:

| | |
|---|---|
| Trans-1,4 | 60% |
| Cis-1,4 | 20% |
| Vinyl-1,2 | 20% |

They are liquid, hydroxyl-terminated polymers of the following typical compositions and properties as given in Sinclair's Research Bulletin No. 506, page 2, referred to herein as

| ARCO DESIGNATION | R-45M | CS-15 | CN-15 |
|---|---|---|---|
| Composition: | | | |
| Butadiene, wt. % | 100 | 75 | 85 |
| Styrene, wt. % | — | 25 | — |
| Acrylonitrile, wt. % | — | — | 15 |
| Viscosity, poises at 30° C. | 50 | 225 | 400 |
| Hydroxyl content, meq/gm | 0.80 | 0.75 | 0.70 |
| Hydroxyl number (KOH mg/gm) | 45 | 42 | 39 |
| Equivalent weight | 1250 | 1330 | 1430 |
| Moisture, wt. % | 0.05 | 0.05 | 0.05 |
| Iodine number | 398 | 335 | 345 |
| Wt. per gal., lbs. | 7.50 | 7.60 | 7.70 |
| Functionality* | 2.2–2.4 | 2.5–2.8 | 2.5–2.8 |

*The number of hydroxy groups per polymer chain.

The properties vary somewhat as recorded in the different ARCO (Sinclair) Bulletins.

| | |
|---|---|
| Other designations are: | |
| Adiprene L-167 | = Liquid polytetrahydrofuran, isocyanate terminated, 6.3% NCO. Sp. gr. 1.07±02 obtained from DuPont. |
| Epoxy Resin/Carbon Black Blend V-780 | = 10/90 carbon black (epoxy resin paste sold by the Color Division of Ferro Corp.) |
| Ethyl 702 | = 4,4'-methylenebis(2,6-di-t-butyl-phenyl), an antioxidant manufactured by Ethyl Corp. |
| Hi-Sil 233 | = Precipitated hydrated silica; less than 325 mesh, manufactured by Pittsburgh Plate Glass Co. |
| Hylene T | = Toluene diisocyanate (at least 96% 2,4-isomer, balance 2,6-isomer) DuPont. |
| Isonate 143L | = Similar to diphenylmethane diisocyanate. (Upjohn) |
| Isonol C100 | = N,N-bis(2-hydroxypropyl)aniline. (Upjohn) |
| ISAF Black | = Intermediate super abrasion oil-furnace black. |
| MOCA | = Methylene-bis-orthochloroaniline sold by DuPont. |
| SAF Black | = Super abrasion furnace black. |
| SHELL DUTREX 916 | = Rubber processing oil sold by Shell Oil Co. |
| Silicone Oil DC-200 | = Silicone type oil sold for mold lubricant manufactured by Dow-Corning Company. |

The properties reported below were determined by the following recognized tests:

| | |
|---|---|
| Compression set | = ASTM D-395 Method B. |
| Firestone Flexometer | = ASTM D-632-62 Method B. |
| Adhesion | = ASTM D-413-39, machine method, strip specimens. |
| 100% or 300% Modulus; Tensile Strength; Ultimate Elongation: | ASTM D-412 62T Die "C" |
| Ring Tear (Crescent tear) | = ASTM D-624-54 Die "B" |
| Short "A" Hardness | = ASTM D-2240-64T |
| Stanley-London Wet Skid Resistance | = ASTM E-303-69 |
| Steel Ball Rebound | = J. H. Dillon, I. B. Prettyman and G. L. Hall, J.Appl.Phys., 15, 309 (1944) |

PANIC STOP TEST

TEST CAR: 1966 Chevrolet Impala.
TEST CONDITIONS: Tires inflated to 24 psi. Rear brakes were disconnected by means of a valve in the hydraulic brake line. All stopping was done with the front brakes exclusively.

The car was accelerated to 20 or 30 mph., held momentarily, and the brakes applied to an immediate "lock-up" condition and held until the car came to a complete stop. The road surface was highly abrasive, fine aggregate macadam. Exceptions to this test procedure are noted.

In the examples and elsewhere, "parts" refers to parts by weight per 100 parts of polymer, but in referring to classes of materials, such as diisocyanates generally, for example, it will be appreciated that the different members of any class of additives and also the polymers will have different molecular weights, so that the amounts given are to be considered suggestive.

In many of the examples that follow, two sets of properties are given: laboratory vulcanizate properties and tire tread performance results. In most cases, both sets of results came from the cure of the same mix of tread. Exceptions to this are noted for specific examples.

Since many tires were made for each example, average results are given for laboratory vulcanizate properties.

THE CURE CYCLE FOR TIRES

All examples which follow refer to compositions which were actually made into tires. For each a record was kept of the detailed heat treatment at various stages in the preparation of a tire. The equipment used differed somewhat from that disclosed in Beneze U.S. Pat. No. 3,555,141; a template somewhat longer than the template 48 shown in Beneze may be used to spread the tread compound in the mold.

The following table shows the numbers of the various examples from which tires were made.

The various stages are identified in the table by letters having the following meanings:

A. Refers to the method in which the tread was initially put into the tire mold. In most cases, the means for stuffing the tread stock into the mold was heated to 160° to 170° F. Such heating was found to facilitate the spreading of tread stock which was at room temperature. Use of this method is designated by "Yes".

B. At this stage the tread was pre-set in the mold at 225° F. for the minutes indicated, in order to give it sufficient strength to better retain its shape prior to casting the body stock against it.

C. After the pre-set treatment the tread was allowed to cool to room temperature in the mold for the number of minutes indicated, and various assembly and disassembly operations on the experimental mold were performed during this time, prior to casting the tire body.

D. Just before casting the body, heaters in the mold were set for 225° F. for heating for the minutes indicated, to raise the temperature of the tread and mold to approximate that of the body stock while it was being cast. At this point the body was cast centrifugally in the mold against the tread and an additional 2 minutes were required for the casting operation. The heaters were on during these 2 minutes.

E. In some cases (indicated by "Yes" or "No") the temperature was maintained at 225° F. for 20 minutes to extend the cure time. This was done to increase the time of the cure of the tread without affecting the properties of the body. After this the main cure was given to the tread and body of each tire for 2 hours at 250° F.

After the 2-hour main cure, the heat was discontinued and the tire continued to spin for 1 hour to allow for cooling. The tire was then removed from the mold.

The examples include the results of tests made on tires having treads as separately indicated and tire bodies prepared from the following:

|  | PARTS BY WEIGHT |
|---|---|
| Adiprene L-167 | 100 |
| Silicone Oil DC-200 | 0.1 |
| Epoxy Resin/Carbon Black Blend ("V-780") | 2.5 |
| Di(2-ethylhexyl)phthalate | 20 |
| MOCA | 19, 20 or 21 |

In some cases, no special color was given to the tire body, and in these instances the Epoxy Resin/Carbon Black Blend V-780 was omitted. The variation in MOCA content was due to batch to batch variations in percent NCO in the Adiprene L-167, more MOCA being used for the stocks of higher NCO content.

The recipe is illustrative only, and other stocks may be used in which there are elastomers with sites reactive with the reactive sites in the tread compounds.

EXPLANATION OF TEST REPORTS

| DOT | = U.S. Department of Transportation REASONS FOR TIRE FAILURE |
|---|---|
| TCO | = Tread Chunk-Out |
| TSOB | = Tread Separation Off Body |
| SWFB | = Sidewall Flex Break |

The body stock was prepared in a stainless steel pressure vessel provided with a power stirrer, a heating and a cooling jacket, connections for supplying nitrogen and for pulling a vacuum in the free space of the vessel, and a valved discharge conduit at the bottom of the vessel. The prepolymer and all ingredients except the MOCA were charged together into the vessel under a blanket of nitrogen, and the vessel closed. A vacuum of 3–5 mm. absolute was then pulled on the vessel, and the contents agitated and heated at 162° F. (72° C.) for 2 hours, after which the vessel was opened and the free space in the vessel flooded with nitrogen. The MOCA was melted, supercooled to 99° F. and added to the vessel with stirring. The vacuum was then reapplied, and the mixture stirred for 3 minutes. Nitrogen pressure was then introduced into the vessel, and the contents blown out through the discharge conduit into a mold against the tread stock previously applied to the tread of the mold. The centrifugal rotation of the mold and the oven temperature were maintained at 250° F. for 2 hours, after which the rotation was continued in open air to cool the mold. At the end of this time, the rotation was stopped, and the tire stripped from the mold. Most treads are completely cured during this cycle.

TABLE

| EXAMPLE NO. | 1 | 2 | 3 | 4 | 5 | 6 | 7 | 8 | 9 | 10 |
|---|---|---|---|---|---|---|---|---|---|---|
| A | Yes | Yes | Yes | Yes | Yes | Yes | Yes | Yes | Yes | Yes |
| B | 11 | 11 | 20 | 20 | 20 | 20 | 36 | 20 | 30 | 20 |
| C | 53 | 53 | 44 | 105 | 90 | 35 | 29 | 90 | 90 | 90 |
| D | 4 | 4 | 8 | 8 | 8 | 17 | 8 | 8 | 8 | 8 |
| E | No | No | Yes | Yes | Yes | No | Yes | Yes | Yes | Yes |

EXAMPLE 1

| RECIPE: | | |
|---|---|---|
| | 100 parts | ARCO CS-15 |
| | 50 " | ISAF Black |
| | 15 " | ZnO |
| | 15 " | Shell Dutrex 916 |
| | 1 " | Ethyl 702 |
| | 0.05 " | Dibutyl tin dilaurate |
| | 6.48 " | Hylene-T |
| | NCO/OH | 1.20 |

PHYSICAL PROPERTIES:
Stress-Strain Properties - Cured 180' at 212° F. plus 30' at 280° F.
| | | |
|---|---|---|
| 300% Modulus, psi | — | 875 |
| Tensile Strength, psi | — | 1675 |
| Ultimate Elongation, % | — | 530 |
| 212° F. Tensile Strength | — | 820 |

212° F. Crescent Tear - Cured 180' at 212° F.
| Lbs./in. | — | 248 |

Rebound - Cured 180' at 212° F. plus 40' at 280° F.
| % at 73° F. | — | 35 |
| % at 212° F. | — | 35 |

Shore "A" Hardness - Cured 180' at 212° F. plus 40' at 280° F.

Firestone Flexometer Test - Cured 180' at 212° F. plus 50' at 280° F.
| Running Temperature, °F. | — | 335 |
| Blow-out Time, min. | — | 40 |

Stanley-London Wet Skid Resistance - Standard
Cured 60' at 280° F.(laboratory batch)     Firestone Control
| C.F. | — | 40 | 41 |
| Index | — | 97 | 100 |

Compression Set - 22 Hrs./158° F. -
Cured 180' at 212° F. plus 42' at 280° F.
| % | — | 41 |

Adhesion to Cast Tire Body Stock - Pre-set - Cured
| Lbs./in.: | 73° F.) | |
| | 250° F.) | not determined |

TIRE TREAD PROPERTIES:
| DOT ENDURANCE | 245 mi., TSOB, TCO |
| DOT High Speed | Not tested |
| Panic Stop: | Not tested |
| | Initial Speed, mph. |
| | Stopping Distance, ft. |
| | Abrasion loss, in. |
| Wear Tests | Not tested |
| Tire Size | E 78-14 |

EXAMPLE 2

| RECIPE: | | |
|---|---|---|
| | 100 parts | ARCO CS-15 |
| | 50 " | ISAF Black |
| | 15 " | ZnO |
| | 15 " | Shell Dutrex 916 |
| | 1 " | Ethyl 702 |
| | 0.05 " | Dibutyl tin dilaurate |
| | 7.01 " | Hylene-T |
| | NCO/OH | 1.30 |

PHYSICAL PROPERTIES:
Stress-Strain Properties - Cured 180' at 212° F.
| 300% Modulus, psi | — | 1000 |
| Tensile Strength, psi | — | 1825 |
| Ultimate Elongation, % | — | 520 |
| 212° F. Tensile Strength | — | 680 |

212° F. Crescent Tear - Cured 180' at 212° F.
| Lbs./in. | — | 134 |

Rebound - Cured 180' at 212° F.
| % at 73° F. | — | 36 |
| % at 212° F. | — | 37 |

Shore "A" Hardness - Cured 180' at 212° F. - 65

Firestone Flexometer Test - Cured 180' at 212° F.
| Running Temperature, °F. | — | 325 |
| Blow-out Time, min. | — | 50 |

Stanley-London Wet Skid Resistance - Standard
Cured 180' at 212° F.     Firestone Control
| C.F. | — | 39 | 41 |
| Index | — | 95 | 100 |

Compression Set - 22 Hrs./158° F. -
Cured 180' at 212° F.
| % | — | 32 |

Adhesion to Cast Tire Body Stock - Pre-set - Cured
| Lbs./in.: | 73° F.) | |
| | 250° F.) | not determined |

TIRE TREAD PROPERTIES:
| DOT Endurance | >1700 mi. (passes DOT) |
| DOT High Speed | not tested |
| Panic Stop: | (1971 Chevelle - 4-wheel lock-up) |

EXAMPLE 2-Continued

| Initial Speed, mph. - 65 |
| Stopping Distance, ft. -265 |
| Abrasion loss, in. - 0.156 |
| Surface in asphalt - moderate to large aggregate |
| Wear Tests | not run |
| Tire Size | E 78×14 |

EXAMPLES 1 and 2

Examples 1 and 2 illustrate the importance of NCO-/OH ratio on tread properties. In Example 1, the ratio of 1.20 produced a tread which failed the DOT Endurance test after only 245 miles. By contrast, a ratio of 1.30 (Example 2) produced a tread which passed the DOT Endurance test.

EXAMPLE 3

| RECIPE: | | |
|---|---|---|
| | 100 parts | ARCO CS-15 |
| | 50 " | ISAF Black |
| | 6.5" | Isonol C-100 |
| | 10 " | Shell Dutrex 916 |
| | 1 " | Ethyl 702 |
| | 0.125 " | Dibutyl tin dilaurate |
| | 15.16" | Hylene-T |
| | NCO/OH | 1.39 |

PHYSICAL PROPERTIES:
Stress-Strain Properties - Cured 180'/212°F.
| 300% Modulus, psi | — | 2000 |
| Tensile Strength, psi | — | 2200 |
| Ultimate Elongation, % | — | 320 |
| 212° F. Tensile Strength | — | 740 |

212° F. Crescent Tear - Cured 180'/212°F.
| Lbs./in. | — | 133 |

Rebound - Cured 180'/212°F.
| % at 73° F. | — | 39 |
| % at 212° F. | — | 41 |

Shore "A" Hardness - Cured 180'/212°F. - 79

Firestone Flexometer Test - Cured 180'/212°F.
| Running Temperature, °F. | — | 295 |
| Blow-out Time, min. | — | 35 |

Stanley-London Wet Skid Resistance - Standard
Cured 180'/212°F.     Firestone Control
| C.F. | — | 39 | 41 |
| Index | — | 95 | 100 |

Compression Set - 22 Hrs./158° F. -
Cured 180'/212°F.
| % | — | 45 |

Adhesion to Cast Tire Body Stock - Pre-set - Cured
| Lbs./in.: | 73° F.) | |
| | 250° F.) | Not determined |

TIRE TREAD PROPERTIES:
| DOT Endurance | 1030 mi. TS (eliminating catalyst improved this result to 1660 mi.- SWFB) |
| DOT High Speed | Not tested |
| Panic Stop: | |
| | Initial Speed, mph. -30 |
| | Stopping Distance, ft.-88 |
| | Abrasion loss, in. - 0.09 |
| Wear Tests | Not tested |
| Tire Size | E 78-14 |

EXAMPLE 3

This example shows that dialcohols can be used in tread stock recipes. This particular recipe had a high level of dibutyl tin dilaurate catalyst (0.125 phr), and consequently, the tread separated during the DOT Endurance test. Eliminating this catalyst avoided the tread separation problem.

EXAMPLE 4

| RECIPE: | | |
|---|---|---|
| | 100 parts | ARCO CS-15 |
| | 50 " | SAF Black |
| | 7.5" | Shell Dutrex 916 |
| | 1 " | Ethyl 702 |
| | 0.05 " | Dibutyl tin dilaurate |

EXAMPLE 4-Continued

| | | |
|---|---|---|
| 8.77 " | Hylene-T | |
| NCO/OH | 1.60 | |

PHYSICAL PROPERTIES:

| | | |
|---|---|---|
| Stress-Strain Properties - Cured 180'/212°F. | | |
| 300% Modulus, psi | — | 1440 |
| Tensile Strength, psi | — | 2050 |
| Ultimate Elongation, % | — | 410 |
| 212° F. Tensile Strength | — | 825 |
| 212° F. Crescent Tear - Cured 180'/212°F. | | |
| Lbs./in. | — | 146 |
| Rebound - Cured 180'/212°F. | | |
| % at 73° F. | — | 36 |
| % at 212° F. | — | 42 |
| Shore "A" Hardness - Cured 180'/212°F. - 70 | | |
| Firestone Flexometer Test - Cured 180'/212°F. | | |
| Running Temperature, °F. | — | 276 |
| Blow-out Time, min. | — | 49 |
| Stanley-London Wet Skid Resistance - | Standard | |
| Cured 180'/212°F. | Firestone Control | |
| C.F. | — 40 | 41 |
| Index | — 97 | 100 |
| Compression Set - 22 Hrs./158° F. - | | |
| Cured 180'/212°F. | | |
| % | — | 54 |
| Adhesion to Cast Tire Body Stock - Pre-set - 10'/212°F. | | |
| Cured 180'/212°F. | | |
| Lbs./in.: 73° F. | — | 47 |
| 250° F. | — | 27 |

TIRE TREAD PROPERTIES:

| | |
|---|---|
| DOT Endurance | 964 mi. Body break beneath tread. |
| DOT High Speed | 0.5 hr./75 mph. Bead failure. |
| Panic Stop: | |
| Initial Speed, mph. | -30 |
| Stopping Distance, ft. | -89 |
| Abrasion loss, in | - 0.07 |
| Wear Tests | not tested |
| Tire Size | E 78-14 |

EXAMPLE 4

Example 4 is to be compared with a recipe found in ARCO Product Bulletin BD-2, page 7, Stock No. 1. The recipe of this example differs by having 1 phr of antioxidant and a higher NCO/OH ratio. The SAF black gave good properties. Although tires failed the DOT Endurance and High Speed Tests, the failures were unrelated to the tread.

EXAMPLE 5

| RECIPE: | 100 parts | ARCO CS-15 |
|---|---|---|
| | 50 " | ISAF Black |
| | 15 " | Shell Dutrex 916 |
| | 1 " | Ethyl 702 |
| | 10.69 " | Isonate 143L |
| | NCO/OH | 1.15 |

PHYSICAL PROPERTIES:

| | | |
|---|---|---|
| Stress-Strain Properties - Cured 180'/212°F. | | |
| 300% Modulus, psi | — | 1950 |
| Tensile Strength, psi | — | 2150 |
| Ultimate Elongation, % | — | 320 |
| 212° F. Tensile Strength | — | 760 |
| 212° F. Crescent Tear - Cured 180'/212°F. | | |
| Lbs./in. | — | 97 |
| Rebound - Cured 180'/212°F. | | |
| % at 73° F. | — | 24 37 |
| % at 212° F. | — | 48 |
| Short "A" Hardness - Cured 180'/212°F. - 64 | | |
| Firestone Flexometer Test - Cured 180'/212°F. | | |
| Running Temperature. °F. | — | 297 |
| Blow-out Time, min. | — | >60 |
| Stanley-London Wet Skid Resistance - | Standard | |
| Cured 180'/212°F. | Firestone Control | |
| C.F. | — 40 | 41 |
| Index | — 99 | 100 |
| Compression Set - 22 Hrs./158° F.- | | |
| Cured 180'/212°F. | | |
| % | — | 48 |
| Adhesion to Cast Tire Body Stock - Pre-set - 10'/212°F. | | |
| Cured 180'/212°F. | | |
| Lbs./in.: 73° F. | — | 55 |
| 250° F. | — | 5 |

TIRE TREAD PROPERTIES:

| | |
|---|---|
| DOT Endurance | 900 mi. TSOB |
| DOT High Speed | Not tested |

EXAMPLE 5-Continued

| | |
|---|---|
| Panic Stop: | |
| Initial speed, mph. | -30 |
| Stopping distance, ft. | -76 |
| Abrasion loss, in. | - 0.04 |
| Wear Tests | None |
| Tire Size | E 78-14 |

EXAMPLE 5

Example 5 shows that other polyisocyanates can be used in treads besides Hylene-T. In this case Isonate 143L was used. Isonate 143L sets up the masterbatch faster than Hylene-T, and this fact explains the tread separation problem in the DOT Endurance test. Panic stop results for this example were quite good.

EXAMPLE 6

| recipe: | 100 parts | ARCO R45M |
|---|---|---|
| | 50 " | ISAF Black |
| | 15 " | Shell Dutrex 916 |
| | 1 " | Ethyl 702 |
| | 0.05 " | Dibutyl tin dilaurate |
| | 7.00 " | Hylene-T |
| | NCO/OH | 1.15 |

PHYSICAL PROPERTIES

| | | |
|---|---|---|
| Stress-Strain Properties - Cured 180'/212°F. | | |
| 300% Modulus, psi | — | 725 |
| Tensile Strength, psi | — | 1675 |
| Ultimate Elongation, % | — | 570 |
| 212° F. Tensile Strength | — | 750 |
| 212° F. Crescent Tear - Cured 180'/212°F. | | |
| Lbs./in. | — | 210 |
| Rebound - Cured 180'/212°F. | | |
| % at 73° F. | — | 38 |
| % at 212° F. | — | 36 |
| Shore "A" Hardness - Cured 180'/212°F. - 53 | | |
| Firestone Flexometer Test - Cured 180'/212°F. | | |
| Running Temperature, °F. | — | 331 |
| Blow-out Time, min. | — | >60 |
| Stanley-London Wet Skid Resistance - | Standard | |
| Cured 70'/300°F.(laboratory batch) | Firestone Control | |
| C.F. | — 35 | 41 |
| Index | — 85 | 100 |
| Compression Set - 22 Hrs./158° F. - | | |
| Cured 180'/212°F. | | |
| % | — | 35 |
| Adhesion to Cast Tire Body Stock - Pre-set - 12'/212°F. | | |
| Cured 180'/212°F. | | |
| Lbs./in.: 73° F. | — | 59 |
| 250° F. | — | 35 |

TIRE TREAD PROPERTIES:

| | |
|---|---|
| DOT Endurance | 485 mi. TCO |
| DOT High Speed | Not tested |
| Panic Stop: | |
| Initial speed, mph. | - 20 |
| Stopping Distance, ft. | - 31 |
| Abrasion loss, in. | - Not measured |
| Wear Tests | Not tested |
| Tire Size | E 78-14 |

EXAMPLE 7

| RECIPE: | 100 Parts | ARCO R45M |
|---|---|---|
| | 50 " | ISAF Black |
| | 15 " | ZnO |
| | 15 " | Shell Dutrex 916 |
| | 1 " | Ethyl 702 |
| | 0.05 " | Dibutyl tin dilaurate |
| | 8.60 " | Hylene-T |
| | NCO/OH | 1.30 |

PHYSICAL PROPERTIES:

| | | |
|---|---|---|
| Stress-Strain Properties - Cured 180'/212°F. | | |
| 300% Modulus, psi | — | 800 |
| Tensile Strength, psi | — | 1425 |
| Ultimate Elongation, % | — | 470 |
| 212° F. Tensile Strength | — | 710 |
| 212° F. Crescent Tear - Cured 180'/212°F. | | |
| Lbs./in. | — | 134 |
| Rebound - Cured 180'/212°F. | | |
| % at 73° F. | — | 44 |
| % at 212° F. | — | 47 |

EXAMPLE 7-Continued

Shore "A" Hardness - Cured 180'/212°F. - 57
Firestone Flexometer Test - Cured 180'/212°F.
Running Temperature, °F. — 360
Blow-out Time, min. — 30
Stanley-London Wet Skid Resistance -       Standard
Cured 180'/212°F.                          Firestone Control
    C.F. — 37 41
    Index — 90 100
Compression Set - 22 Hrs./158°F. -
Cured 180'/212°F.
    % — 45
Adhesion to Cast Tire Body Stock - Pre-set
Cured
    Lbs./in.: 73° F.)
               250°F.)   not determined TIRE TREAD PROPERTIES:
DOT Endurance >1700 mi. (passes DOT)
DOT High Speed Not tested
Panic Stop: 1971 Chevelle (4-wheel lock-up)
    Initial Speed, mph. - 65
    Stopping Distance, ft.-265
    Abrasion loss, in. - 0.156
    Asphalt--moderate to rough aggregate
Wear Tests:
    22 miles/mil on a course of moderate severity
    (control = 68 miles/mil)
Tire Size E 78-14

EXAMPLE 8

RECIPE: 100 parts ARCO CN-15
           50 " ISAF Black
           15 " Shell Ditrex 916
           1 " Ethyl 702
           0.05 " Dibutyl tin dilaurate
           7.01 " Hylene-T
           NCO/OH 1.30

PHYSICAL PROPERTIES:
Stress-Strain Properties - Cured 180'/212°F.
    300% Modulus, psi — 1550
    Tensile Strength, psi — 2000
    Ultimate Elongation, % — 360
    212° F. Tensile Strength — 850
212° F. Crescent Tear - Cured 180'/212°F.
    Lbs./in. — 70
Rebound - Cured 180'/212°F.
    % at 73° F. — 34
    % at 212° F. — 47
Shore "A" Hardness - Cured 180'/212°F. - 63
Firestone Flexometer Test - Cured 180'/212°F.
    Running Temperature, °F. — 260
    Blow-out Time, min. — >60
Stanley-London Wet Skid Resistance -       Standard
Cured 180'/212°F.                          Firestone Control
    C.F. — 41 41
    Index — 100 100
Compression Set - 22 Hrs./158° F. -
Cured 180'/212°F.
    % — 20
Adhesion to Cast Tire Body Stock - Pre-set - 10'/212°F.
Cured 180°/212°F.
    Lbs./in.: 73° F. — >84
               250° F. — 21

TIRE TREAD PROPERTIES:
DOT Endurance 705 mi. SWFB
DOT High Speed Not tested
Panic Stop:
    Initial speed, mph. -30
    Stopping distance, ft.-81
    Abrasion loss, in. - 0.04
Wear Tests None
Tire Size E 78-14

EXAMPLES 6, 7 and 8

Example 6 shows a tread stock make from OH-terminated polybutadiene, at an NCO/OH ratio of 1.15. This tire failed the DOT Endurance test and the failure could be related to the low NCO/OH ratio (see Examples 1 and 2).

Example 7 is to be compared with that given in ARCO Product Bulletin BD-2, page 16, Stock No. 3. Example 7 differs in that ISAF carbon black, 1 phr of antioxidant, and a higher tolylene diisocyanate level were used. This tread passed the DOT Endurance test. The tire was also wear tested on a car on a course of moderate severity, but results were poor. Abrasion loss was 22 miles/mil, compared to 68 miles/mil for the control tire.

Example 8 shows the use of butadiene-acrylonitrile copolymer as tread stock. Tread performance was quite good in the panic stop test. The tire did not pass the DOT Endurance test due to a failure in the body.

EXAMPLE 9

RECIPE: 56.09 parts ARCO CS-15
           43.91 " Adiprene L-167
           28.05 " ISAF Black
           8.41 " Shell Dutrex 916
           0.56 " Ethyl 702
           0.03 " Dibutyl tin dilaurate
           NCO/OH 1.90

PHYSICAL PROPERTIES:
Stress-Strain Properties - Cured 45'/280° F.
    300% Modulus, psi — 1000
    Tensile Strength, psi — 1850
    Ultimate Elongation, % — 450
    212° F. Tensile Strength — 415
212° F. Crescent Tear - Cured 45'/280°F.
    Lbs./in. — 72
Rebound - Cured 60'/280°F.
    % at 73° F. — 41
    % at 212° F. — 50
Shore "A" Hardness - Cured 60'/280°F. - 58
Firestone Flexometer Test - Cured 60'/280°F.
    Running Temperature, °F. — 260
    Blow-out Time, min. — 40
Stanley-London Wet Skid Resistance -       Standard
Cured 45'/280°F. (laboratory batch)        Firestone Control
    C.F. — 40 41
    Index — 97.2 100
Compression Set - 22 Hrs./158° F. -
Cured 60'/280°F.
    % — 33
Adhesion to Cast Tire Body Stock - Pre-set - 10'/212°F.
Cured 180'/212°F.
    Lbs./in.: 73° F. — 86
               250° F. — 35

TIRE TREAD PROPERTIES:
DOT Endurance 860 mi. TS
DOT High Speed >1/2 hr. at 85 mph (passes DOT)
Panic Stop:
    Initial speed, mph. -30
    Stopping distance, ft.-78
    Abrasion loss, in. - 0.05
Wear Tests Not tested
Tire Size E 78-14

EXAMPLE 9

In this example, the curing agent for the tread stock was Adiprene L-167. Thus, in this case the diisocyanate had a polytetrahydrofuran backbone which is elastomeric and is therefore considered to be a part of the elastomeric content of the total recipe. Hence the total elastomeric content of the tread recipe was a 56/44 blend of ARCO CS-15 and Adiprene L-167. Note that the elastomer of the tire body (not the tread) was 100 percent Adiprene L-167.

EXAMPLE 10

RECIPE: 100 parts ARCO CS-15
           50 " HiSil 233
           1 " Ethyl 702
           0.25 " Dibutyl tin dilaurate
           10.68 " Hylene-T
           NCO/OH 1.95

PHYSICAL PROPERTIES:
Stress-Strain Properties - Cured 180'/212°F.
300% — — (—)
Modulus, psi

EXAMPLE 10-Continued

| | | |
|---|---|---|
| Tensile Strength, psi | — | 625 | (2625) |
| Ultimate Elongation, % | — | 80 | (300) |
| 212° F. Tensile Strength | — | 120 | (750) |
| 212° F. Crescent Tear - Cured 180'/212°F. Lbs./in. | — | 3 | (96) |
| Rebound - Cured 180'/212°F. | | | |
| % at 73° F. | — | 54 | (56) |
| % at 212° F. | — | 59 | (58) |
| Shore "A" Hardness - Cured 180'/212°F. | | 80 | (75) |
| Firestone Flexometer Test - Cured 180'/212°F. | | | |
| Running Temperature, °F. | — | 270 | (248) |
| Blow-out Time, min. | — | 30 | (>60) |

| Stanley-London Wet Skid Resistance Cured 180'/212°F. | | Standard Firestone | Control |
|---|---|---|---|
| C.F. | — | 41 (42) | 41 |
| Index | — | 100 (102.6) | 100 |

| Compression Set - 22 Hrs./158° F. Cured 180'/212°F. | | | |
|---|---|---|---|
| % | — | 53 | (41) |

| Adhesion to Cast Tire Body Stock - Pre-set -10'/212°F. Cured 180'/212°F. | | | |
|---|---|---|---|
| Lbs./in.: 73° F. | — | 19 | not determined |
| 250° F. | — | — | |

Comment: Vulcanizate properties in parentheses are values from a laboratory batch with an identical recipe. The poor values for the tire batch were due to undercure at the time of testing. However, on standing at room temperature for several days, the tire treads cured to the same state as given for laboratory properties. (The laboratory batch was cured 45'-60' at 280° F.)

TIRE TREAD PROPERTIES:

| | |
|---|---|
| DOT Endurance | >1700 mi. (passes DOT) |
| DOT High Speed | No test |
| Panic Stop: | |
| | Initial Speed, mph. - 30 |
| | Stopping Distance, ft.-122 |
| | Abrasion loss, in. - 0.10 |
| Wear Tests | Not tested |
| Tire Size | E 78-14 |

I claim:

1. The method of producing a polyurethane tread for a pneumatic tire which comprises producing in one step a polyurethane by heating to curing temperature (a) a polyhydroxy elastomeric polymer of the class consisting of (1) homopolymers and copolymers of conjugated dienes which contain 4 to 6 carbon atoms and (2) copolymers of such a diene and an aromatic vinyl monomer or vinyl nitrile monomer, and (b) a diisocyanate or mixture of diisocyanates, and (c) 5 to 25 parts of N,N-bis(2-hydroxypropyl)aniline per 100 parts of dihydroxy polymer and (d) sufficient reinforcing agent to make the composition serviceable as a tread; the —NCO/—OH ratio of the polymer or polymers and the diisocyanate or diisocyanates being greater than 1.15 to 5.0.

2. A tread for a pneumatic tire the elastomer of which is essentially a polyurethane derived in one-step synthesis from (a) a dihydroxy elastomeric polymer of the class consisting of (1) homopolymers and copolymers of conjugated dienes which contain 4 to 6 carbon atoms and (2) copolymers of such a diene and an aromatic vinyl monomer or vinyl nitrile monomer, and (b) a diisocyanate or mixture of diisocyanates, and (c) 5 to 25 parts of N,N-bis(2-hydroxypropyl) aniline per 100 parts of dihydroxy polymer and (d) sufficient reinforcing agent to make the composition, when cured, serviceable as a tread; the —NCO/—OH ratio of the polymer or polymers and the diisocyanate or diisocyanates being greater than 1.15 to 5.0, which tread comprises reinforcing and other pigment and is substantially free from unreacted diisocyanate.

3. A pneumatic tire, the tread and sidewalls of which are composed of different elastomers bonded directly to one another by curing, the tread being composed of an elastomer which is essentially a polyurethane derived in a one-step synthesis from (a) a dihydroxy elastomeric polymer of the class consisting of (1) homopolymers and copolymers of conjugated dienes which contain 4 to 6 carbon atoms and (2) copolymers of such a diene and an aromatic vinyl monomer or vinyl nitrile monomer, and (b) a diisocyanate or mixture of diisocyanates, and (c) 5 to 25 parts of N,N-bis(2-hydroxylpropyl) aniline per 100 parts of dihydroxy polymer and (d) sufficient reinforcing agent to make the composition serviceable as a tread; the —NCO/—OH ratio of the polymer or polymers and the diisocyanate or diisocyanates in the tread being greater than 1.15 to 5.0, which tread comprises reinforcing and other pigment and is substantially free from unreacted diisocyanate.

* * * * *

PO-1050
(5/69)

UNITED STATES PATENT OFFICE
CERTIFICATE OF CORRECTION

Patent No. 3,897,386                      Dated  July 29, 1975

Inventor(s)   Joseph C. Sanda, Jr.

It is certified that error appears in the above-identified patent and that said Letters Patent are hereby corrected as shown below:

In column 6, line 12, "thread" should be -- tread --.

In column 8, line 24, " Flexometer = ASTM D-632-62" should be -- Flexometer = ASTM D-623-62 --.

In column 8, line 32, "Short "A"" should be -- Shore "A" --

In column 13, line 54, "% at 73°F - 24 37" should be -- % at 73°F - 37 -- delete the 24 completely In column 15, line 28 "Shell Ditrex 916" should be --- Shell Dutrex 916 --.

In column 15, line 60 "a tread stock make" should read -- a tread stock made --.

Signed and Sealed this twentieth Day of January 1976

[SEAL]

Attest:

RUTH C. MASON
Attesting Officer

C. MARSHALL DANN
Commissioner of Patents and Trademarks